United States Patent [19]
Kashiyama

[11] Patent Number: 5,851,472
[45] Date of Patent: Dec. 22, 1998

[54] METHOD OF MANUFACTURING WATERPROOF CONNECTOR HOUSING

[75] Inventor: Motohisa Kashiyama, Shizuoka, Japan

[73] Assignee: Yazaki Corporation, Tokyo, Japan

[21] Appl. No.: 504,827

[22] Filed: Jul. 20, 1995

[30] Foreign Application Priority Data

Jul. 22, 1994 [JP] Japan .................................. 6-170792

[51] Int. Cl.⁶ ........................... B29C 33/12; B29C 33/14
[52] U.S. Cl. .......................... 264/268; 264/267; 264/273; 264/276
[58] Field of Search ..................................... 264/250, 255, 264/267, 268, 273, 275, 276, 328.7, 328.8, 328.9

[56] References Cited

U.S. PATENT DOCUMENTS

| | | | |
|---|---|---|---|
| 3,354,529 | 11/1967 | James | 264/276 |
| 3,373,479 | 3/1968 | Watt et al. | 264/276 |
| 4,336,009 | 6/1982 | Wolf | 264/276 |
| 4,580,962 | 4/1986 | Haas | 264/276 |
| 4,970,103 | 11/1990 | Wolf et al. | 264/276 |
| 5,008,060 | 4/1991 | Kanai et al. | 264/274 |
| 5,306,459 | 4/1994 | Thomason et al. | 264/276 |

Primary Examiner—Angela Ortiz
Attorney, Agent, or Firm—Armstrong, Westerman, Hattori, McLeland & Naughton

[57] ABSTRACT

A method of manufacturing a waterproof connector housing and an apparatus for use in such method wherein an overflow preventing wall which is projected to joining direction of both a male metal mold and a female metal mold is formed around at an edge portion of space for forming a packing, after the overflow preventing wall and the housing are allowed to adhere in such a way that the overflow preventing wall presses the housing arranged between both the metal molds, the rubber material is injected into the space. It can be surely prevented the overflow of the rubber material from the space.

1 Claim, 6 Drawing Sheets

METHOD OF MANUFACTURING WATERPROOF CONNECTOR HOUSING

BACKGROUND OF THE INVENTION

1. Field of the Invention

The present invention relates to a method of manufacturing a waterproof connector housing with a ring-shaped packing integrally formed therewith and an apparatus for use in such method.

2. Description of the Prior Art

FIG. 8 is a cross-sectional view showing a conventional method of manufacturing a waterproof connector housing which has a ring-shaped packing integrally formed therewith a proposed in the Japanese Patent Application Laid Open No. 63-221568.

The conventional method of manufacturing the waterproof connector housing as shown in FIG. 8 will be explained. In the first place, the housing (a), which is formed separately by fabrication, is arranged between the male metal mold (b) and the female metal mold (c). Rubber material is injected by means of the rubber material supply path (e) into a space (d) which is provided for the male metal mold (b) for forming the ring-shaped packing. As a result, the housing (a) and the ring-shaped packing are integrally formed.

However, in the above described method of manufacturing the waterproof connector housing, as shown in FIG. 9, there might be dimensional differences between the height (f) of the stepped part of the housing (a) arranged on the metal mold and the height (g) of the stepped part of the male metal mold (b). In a case where the housing (a) is arranged on the male metal mold (b) and rubber material is injected therein, when (f)>(g), as shown in FIG. 10, since an opening is created at under side of the stepped part of the male metal mold (b), the rubber material overflows as indicated by an arrow (x).

When (f)<(g), as shown in FIG. 11, the rubber material overflows from the top of the stepped part of the male metal mold (b) as indicated by an arrow (y).

In any case, since the prescribed form of packing can not be formed, inferior goods are built up.

It is necessary to enhance dimensional accuracy of the metal mold in order to prevent the overflow of the rubber material. Consequently, manufacturing cost rises. Further, for the purpose of decrease in cost, a multi-cavity mold is employed. In such a case, it is exceedingly difficult to obtain a housing with uniform dimensions. Therefore, since this becomes an obstacle to an increase in productivity, there is a problem that the multi-cavity mold method can not be adopted.

On the other hand, FIG. 12 is a cross-sectional view showing a conventional method of manufacturing a waterproof connector housing in order to prevent the overflow of the rubber material as disclosed in the Japanese Patent Application Laid Open No. 3-219578.

In this method, as shown in FIG. 13, the housing (a'), provided with projections (h1), (h2), and (h3), is installed in the space (k) between the metal molds (i) and (j) and the rubber material is injected therein. In a case where the housing (a') is installed in the metal mold, the projections (h2), (h2), and (h3) are deformed by applying pressure of the metal mold. For that reason, the metal molds (i) and (j) and the housing (a') adhere thereamong, as a result, the overflow of the rubber material is prevented.

However, in a case where the projections (h1), (h2), and (h3) are formed on the housing (a') as described above, the height of the projections must be restricted. Therefore, it is difficult to completely prevent the overflow of the rubber material. Furthermore, since it is necessary to enhance dimensional accuracy of the metal mold in order to deform the projections, manufacturing cost rises. Accordingly the problems are not solved.

SUMMARY OF THE INVENTION

In view of the foregoing, it is an object of the present invention to provide a method of manufacturing a waterproof connector housing and an apparatus for use in such method in the connector housing manufacturing process in which the housing and the ring-shaped packing are integrally formed, wherein overflow of the rubber material can be completely prevented, and wherein productivity thereof is high, and reliability thereof is excellent.

According to one aspect of the present invention, for achieving the above-mentioned object, there is provided a method of manufacturing a waterproof connector housing in which a housing, formed by fabrication, is arranged between a male metal mold and a female metal mold. Rubber material is injected into a space provided for both the male metal mold and the female metal mold or for either the male metal mold or the female metal mold. A ring-shaped packing is integrally formed with the housing, wherein an overflow preventing wall, which projects in the joining direction of both the metal molds, is formed approximately at an edge portion of the space for forming a packing. After the overflow preventing wall and the housing are allowed to adhere, in such a way that the overflow preventing wall presses the housing arranged between both the metal molds, the rubber material is injected into the space.

According to another aspect of the present invention, there is provided an apparatus of a waterproof connector housing having: a pair of molds (i.e., a female metal mold and a male metal mold); a space for forming a packing and a rubber material supply path, provided for both the male metal mold and the female metal mold or for either the male metal mold or the female metal mold; a housing, formed by fabrication, is arranged between the male metal mold and the female metal mold, wherein rubber material is injected into the space through a rubber material circulation path; a ring-shaped packing integrally formed with the housing; and an overflow preventing wall, which projects in the joining direction of both the metal molds, is formed around at an edge portion of the space for forming a packing.

It is preferable that a sectional shape of the overflow preventing wall is a conical shaped configuration.

As stated above, the method of manufacturing the waterproof connector housing and the apparatus for use in such method according to the present invention is provided with an overflow preventing wall at an edge portion of a space of a metal mold for forming a packing. The rubber material is injected into the space near the housing which is dug by the overflow preventing wall of the male metal mold. Therefore, the overflow preventing wall can surely prevent the overflow of the rubber material from the space. Since the overflow preventing wall projects in the metal mold joining direction, even if the thickness of the housing is slightly irregular in dimension or size, the irregularity of the housing can be compensated for by the amount of intrusion of the overflow preventing wall. Consequently, there is no need to enhance both the manufacturing precision of the metal mold and the housing. The productivity of the waterproof connector housing is high and the waterproof connector housing is of high quality with excellent reliability.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 1:
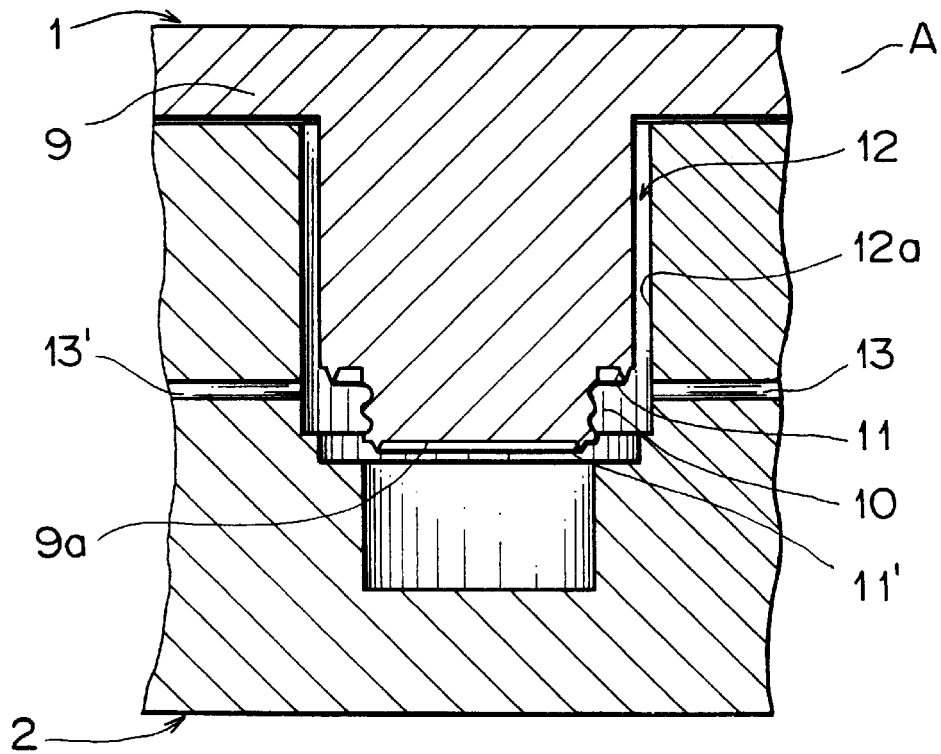
FIG. 1 is a cross-sectional view showing essential portions of a manufacturing apparatus for a waterproof connector housing according to one embodiment of the present invention.

FIG. 1 is a sectional view showing an essential portion of a manufacturing apparatus A for one embodiment of the waterproof connector housing of the present invention.

Figure 2:
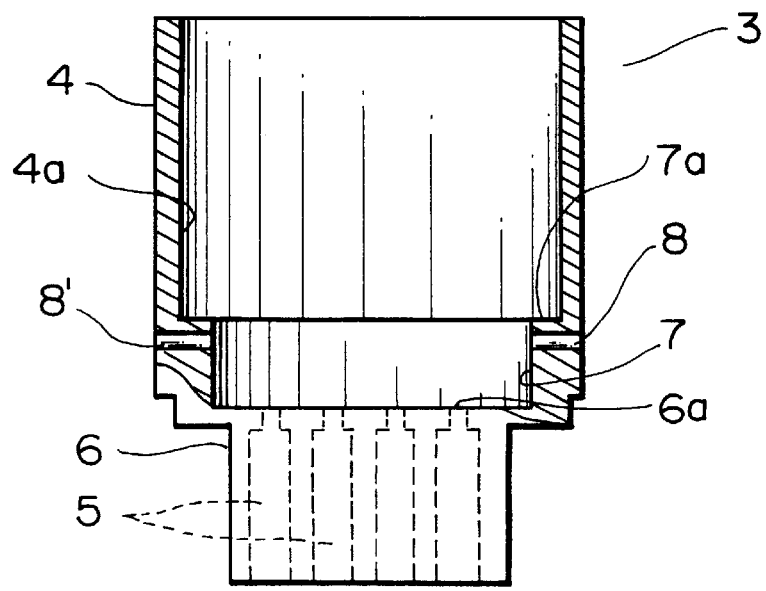
FIG. 2 is a partial cross-sectional view showing a housing installed on the manufacturing apparatus of FIG. 1.

The manufacturing apparatus includes a male metal mold 1 and a female metal mold 2. The housing 3, which is separately formed by fabrication as shown in FIG. 2, is installed between the male metal mold 1 and the female metal mold 2. The rubber material is injected therein so that the housing 3 is integrally formed with a ring-shaped packing.

The housing 3 includes a cylindrical cover portion 4 and a terminal accommodating part 6 having a plurality of terminal accommodating cavities 5. At an inside wall 4a of the housing 3, in the neighborhood of the junction between the cover portion 4 and the terminal accommodating part 6, the stepped part 7 is formed approximately inwardly of the junction. The ring-shaped packing is formed on the inside of the stepped part 7. The rubber material circulation paths 8, 8' are provided for the stepped part 7.

Figure 3:
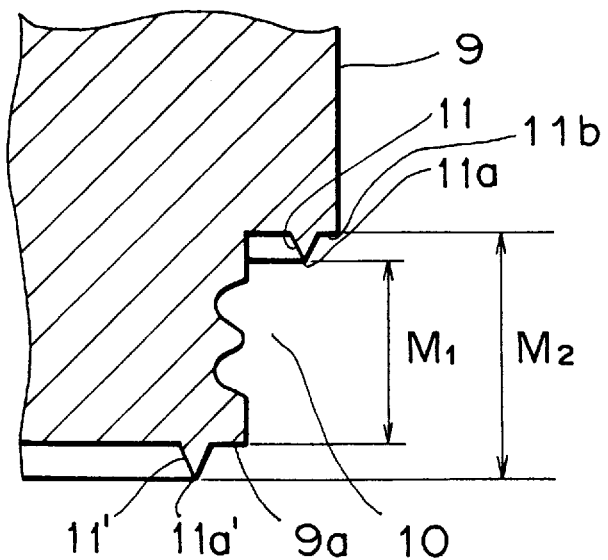
FIG. 3 is an explanatory view showing one embodiment of an overflow preventing wall of the male metal mold of FIG. 1.

The male metal mold 1 includes a cylindrical fitting portion 9 for fitting the cover portion 4 of the housing 3. As shown in FIG. 3, at the periphery of the tip 9a of the fitting portion, a step is provided so that the space 10 for forming the packing is formed approximately outwardly of the tip 9a.

The overflow preventing walls 11, 11' have a cross-sectional shape which presents a conical-shaped configuration. The overflow preventing walls 11, 11' are provided for the edge part of the fitting portion 9. The overflow preventing wall 11, 11' are formed so as to protrude toward the junctional direction of the female metal mold 2.

When the housing 3 is installed on the female metal mold 2 and the male metal mold 1 is installed on the housing 3, the overflow preventing wall 11 is formed at the location where the wall 11 meets the edge wall 7a of the stepped portion 7 of the housing 3. The overflow preventing wall 11' is formed at the location where the wall 11' meets the front wall 6a the terminal accommodating part 6 of the housing 3.

Figure 4:
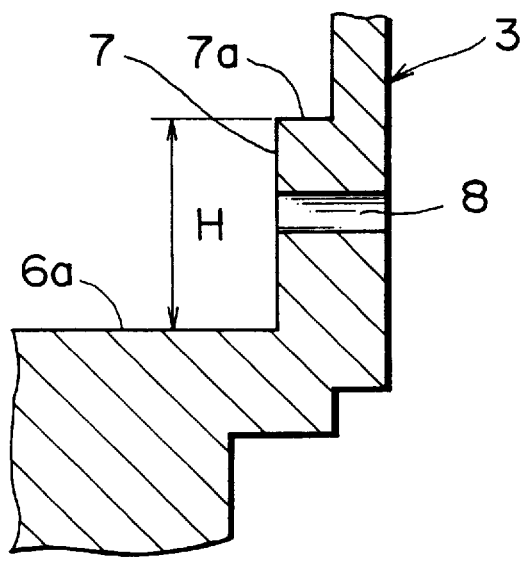
FIG. 4 is an explanatory view showing a stepped part of the housing of FIG. 2.

The female metal mold 2 has a cylindrical accommodating portion 12 coincident with an external diameter of the cover portion 4 of the housing 3. As shown in FIG. 4, at the peripheral wall 12a, the rubber material supply paths 13, 13' are provided so that the supply paths 13, 13' communicate with the rubber material circulation paths 8, 8', respectively, wherein the peripheral wall 12a is roughly opposed to the rubber material supply paths 13, 13'.

When the height from the tip 9a of the fitting portion 9 of the male metal mold 1 to the tip 11a of the overflow preventing wall 11 is $M_1$, the height from the tip 11a' of the overflow preventing wall 11' to the base 11b of the overflow preventing wall 11 is $M_2$, and the height of the stepped portion 7 of the housing 3 is H (referring to FIG. 4), the mutual relationship between $M_1$, $M_2$ and H is established as:

$M_1 < H < M_2$.

Figure 5:
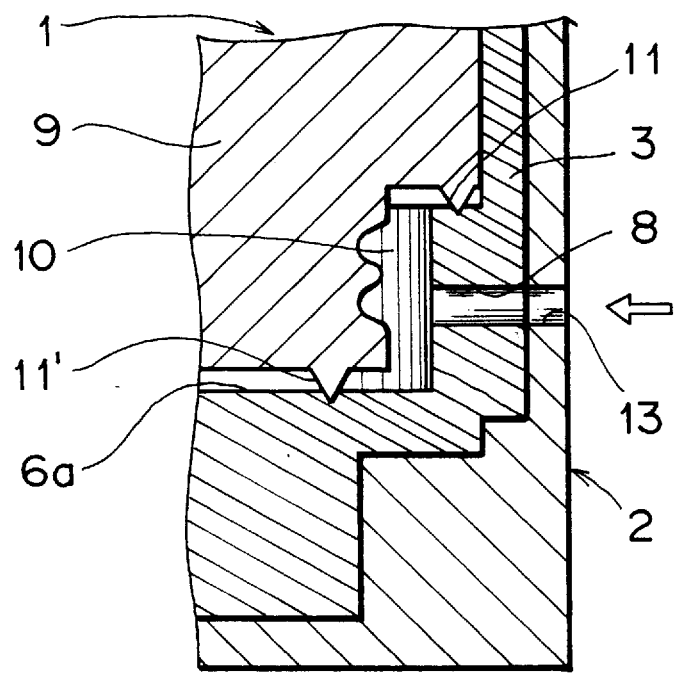
FIG. 5 is a explanatory view showing a manufacturing process in which the housing is installed on the manufacturing apparatus and rubber material is injected therein in regard to FIG. 1.

The following is the method for forming the ring-shaped packing on the housing 3. The housing 3 is fitted into the female metal mold 2. The fitting portion 9 of the male metal mold 1 is fitted into the cover portion 4 of the housing 3. As shown by the arrow z of FIG. 5, the rubber material is injected into the space 10 from the rubber material supply paths 13, 13' through the rubber material circulation paths 8, 8', respectively. It is not necessary to define the kind of rubber material, as long as the rubber material is elastic. For example, an addition reaction type liquid silicone rubber which is not more than $[(CH_3)_2SiO]_{1-10}$, containing low boiling point siloxane content of which is not more than 75 ppm/cm$^3$, is desirable. The liquid silicone rubber layer is formed on the housing 3. The integrally formed ring-shaped packing is formed on the housing 3 by vulcanization of the liquid silicone rubber layer. In a case where the fitting portion 9 of the male metal mold 1 is interposed, since pushing pressure is added to the male metal mold 1, the overflow preventing wall 11 is cut into the end wall 7a of the stepped portion 7 of the housing 3, and also the overflow preventing wall 11' is cut into the front wall 6a of the terminal accommodating part 6.

Figure 6:
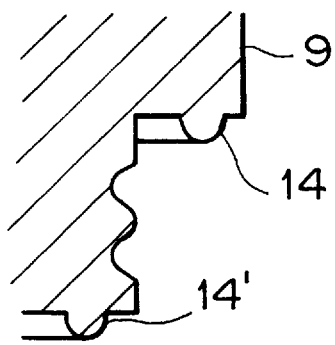
FIG. 6 is a cross-sectional view showing a cross-sectional configuration of the overflow preventing wall according to a second embodiment of the present invention.
Figure 7:
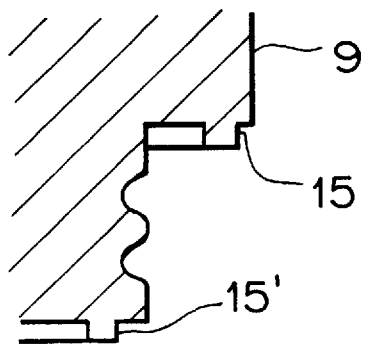
FIG. 7 is a cross-sectional view showing a cross-sectional configuration of the overflow preventing wall according to a third embodiment of the present invention.
Figure 8:
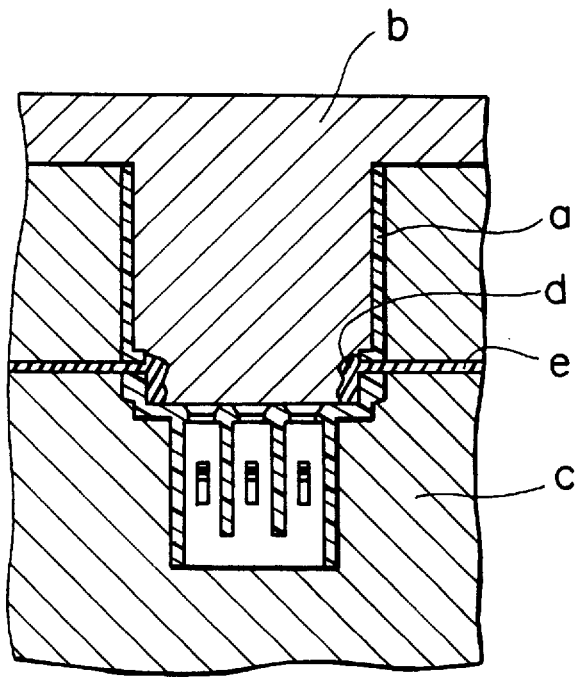
FIG. 8 is an explanatory view of a conventional manufacturing method for waterproof connector housing.
Figure 9:
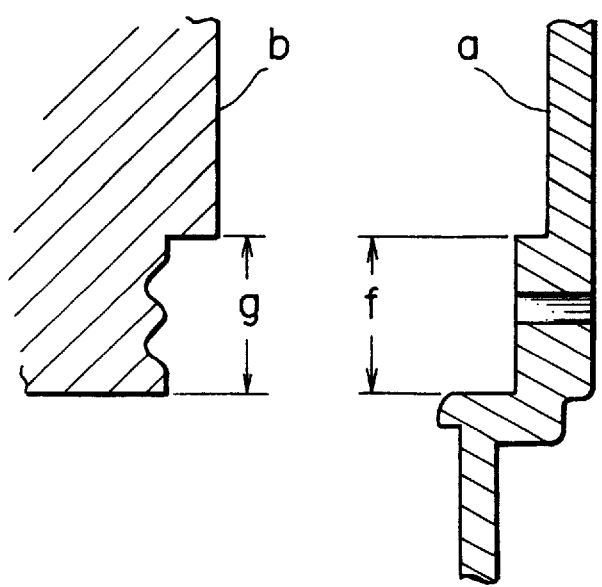
FIG. 9 is an explanatory view showing the height of the stepped part of the housing and height of the stepped part of the male metal mold of FIG. 8.
Figure 10:
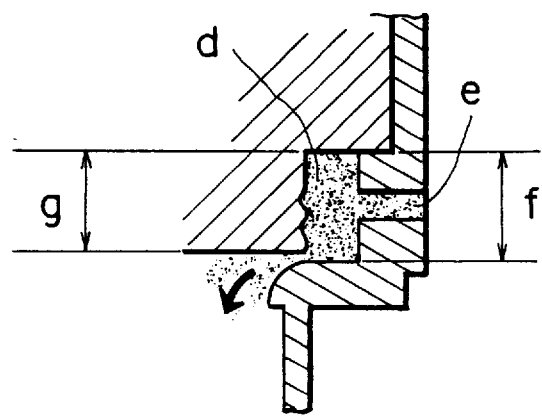
FIG. 10 is an explanatory view showing that the height of the stepped part of the housing is higher than the height of the stepped part of the male metal mold with respect to FIG. 9.
Figure 11:
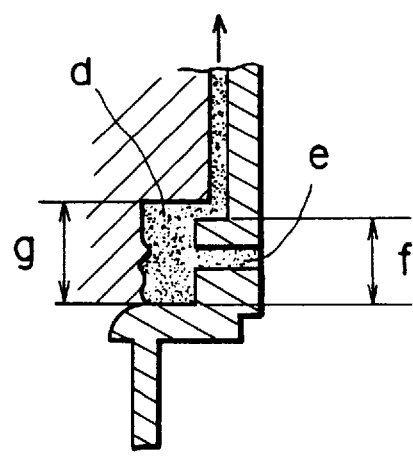
FIG. 11 is an explanatory view showing that the height of the stepped part of the housing is lower than the height of the stepped part of the male metal mold with respect to FIG. 9.
Figure 12:
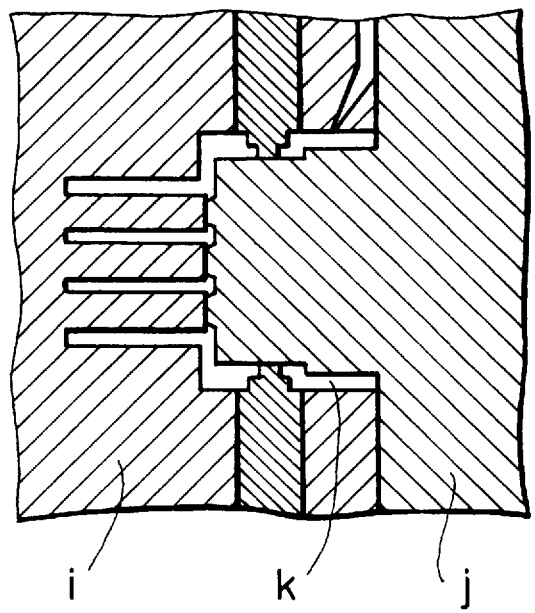
FIG. 12 is a cross-sectional view showing the metal mold referring to another conventional method of manufacturing the waterproof connector housing.
Figure 13:
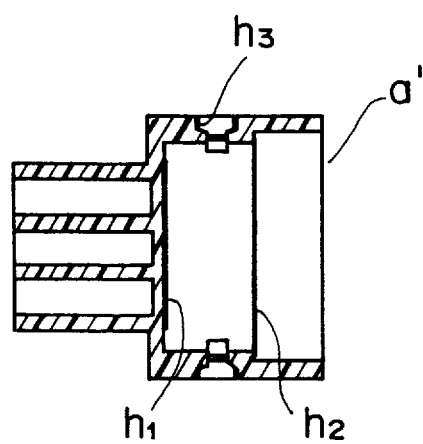
FIG. 13 is a cross-sectional view of the housing installed on the metal mold of FIG. 12.

In the above-described embodiment, the cross-sectional shape of the overflow preventing wall 11 provided for the fitting portion 9 is a conical-shaped configuration. However, the cross-sectional shape thereof is not limited to a conical-shaped configuration. As shown in FIG. 6, the overflow preventing wall 14 may have a circular cross-section. As shown in FIG. 7, the overflow preventing wall 15 may have a rectangular or square cross-section.

Further, in the above-described embodiment, each of the overflow preventing walls 11, 11' is a single wall. However, it is preferable that each of the overflow preventing walls 11, 11' is multi-walled such as double-walled or triple-walled and so forth. By virtue of the provision that the overflow preventing walls are provided to be multiple-walled, even if there is a mechanical injury at the location where the housing meets the overflow preventing wall, the other overflow preventing wall can prevent the overflow of the rubber material. Thus, the prevention of rubber material from overflowing is ensured.

As described above, according to the present invention, an overflow preventing wall is provided on the metal mold. The rubber material is injected into the space near the housing which is created by the overflow preventing wall of the male metal mold 1. Therefore, the overflow of the rubber material from the space can be surely prevented. Since the overflow preventing wall extends to the metal mold in the joining direction, even if the thickness of the housing is a bit irregular in dimension or size, the amount of the irregularity in dimension of the overflow preventing wall can be compensated for. Consequently, there is no need to enhance both the manufacturing precision of the metal mold and the housing and a high quality waterproof connector housing having the ring-shaped packing integrally formed therewith is obtained. Accordingly, other advantages include an increase in productivity, and a decrease in manufacturing cost.

What is claimed is:

1. A method of manufacturing a waterproof connector housing comprising the steps of:

arranging a prefabricated housing between a male metal mold and a female metal mold;

aligning rubber material supply paths on said female metal mold and rubber material circulation paths on said housing;

pressing said male metal mold against said housing in a joining direction of said male metal mold and said female metal mold so that first and second overflow preventing walls projecting from said male metal mold are pressed into a front wall of a terminal accommodating part and an edge wall of a stepped portion of said housing, respectively, in order to define both edges of a space for a ring-shaped packing to be formed integrally with said housing, while surely preventing leakage of a rubber material outside said space, wherein a dimensional relationship of said stepped portion of said housing with said first and second overflow preventing walls is $M_1<H<M_2$, where $M_1$ is a distance from an end plane of a fitting portion of said male metal mold to a tip of said second overflow preventing wall relative to said stepped portion, $M_2$ is a distance from a base of said second overflow preventing wall relative to said stepped portion to a tip of said first overflow preventing wall, and H is a height of said stepped portion;

injecting said rubber material into said space through both said rubber material supply paths and said rubber material circulation paths until said space is filled up; and forming said ring-shaped packing integrally with said housing; and allowing said rubber material injected into said space to adhere to said housing.

* * * * *